United States Patent Office 2,990,417
Patented June 27, 1961

2,990,417
1,2-BIS(POLYFLUOROACYL HYDRAZINES)
Rudolph A. Carboni, Wilmington, Del., assignor to E. I. du Pont de Nemours and Company, Wilmington, Del., a corporation of Delaware
No Drawing. Filed Oct. 19, 1959, Ser. No. 847,055
12 Claims. (Cl. 260—404.5)

This invention relates to a new class of fluorinated organic compounds. More particularly, it relates to a new class of fluorine-containing acylhydrazines.

In spite of the continuously increasing technical interest in highly fluorinated organic compounds, there has been no investigation, with the sole exception noted below, of 1,2-bis-acylhydrazines in which the acyl groups are highly fluorinated, by which is meant here that, in each acyl group, all but at most two of the hydrogen atoms are substituted by fluorine atoms. The sole published reference to compounds of this type is an article by R. A. Carboni and R. V. Lindsey, Jr., in J. Am. Chem. Soc. 80, 5793 (1958), which describes 1,2-bis(2,3,3,3-tetrafluoropropionyl)-hydrazine.

The novel compounds of this invention are 1,2-bis-(polyfluoroacyl)hydrazines. They can be represented by the formula R—CXF—CO—NH—NH—CO—CXF—R, where the symbol R represents a member of the class consisting of fluorine, perfluoroalkyl, ω-hydroperfluoroalkyl and ω-chloroperfluoroalkyl radicals, and X represents a member of the class consisting of fluorine and hydrogen atoms.

The terms used above have their normal significance, i.e., perfluoroalkyl means an alkyl radical containing only carbon and fluorine atoms and omega-hydroperfluoroalkyl or ω-chloroperfluoroalkyl means an alkyl radical containing only carbon and fluorine atoms and one hydrogen or chlorine atom, these hydrogen or chlorine atoms being at the end of the chain. Thus, the above formula includes the 1,2-bis(perfluoroacyl)hydrazines, the 1,2-bis(ω-chloroperfluoroacyl)-hydrazines, the 1,2-bis(ω-hydroperfluoroacyl)hydrazines, the 1,2-bis(α-hydroperfluoroacyl)hydrazines (when X=H and R=fluorine or perfluoroalkyl), the 1,2-bis(α,ω-dihydroperfluoroacyl)hydrazines (when X=H and R=ω-hydroperfluoroalkyl), and the 1,2-bis(α-hydro-ω-chloroperfluoroacyl)hydrazines (when X=H and R=ω-chloroperfluoroalkyl). For the sake of brevity, these compounds will be sometimes referred to hereinafter as 1,2-bis(polyfluoroacyl)hydrazines and, similarly, the group R—CXF— will be referred to as polyfluoroalkyl.

One method of preparing the products of this invention consists in reacting hydrazine or hydrazine hydrate with an amide-forming derivative, e.g., a low alkyl ester, acyl halide or anhydride, of a polyfluoroalkanemonocarboxylic acid, i.e., an acid of the formula

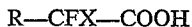

R—CFX—COOH where R and X have the same significance as above. Briefly described, the amide-forming derivative of the polyfluoroalkanecarboxylic acid and hydrazine hydrate are mixed in approximately stoichiometric proportions, if desired in an inert solvent or diluent, and maintained in contact at reaction temperature, which may be, for example, in the range of 0–200° C. (the reaction is generally exothermic when the acyl halides are used) until amide formation has taken place to at least an appreciable extent, after which the fluoroacylhydrazine is separated, and purified if necessary. When the amide-forming derivative is an acid halide, it is desirable to operate in the presence of an acid acceptor, e.g., excess hydrazine, or an inorganic base, or a tertiary amine, to absorb the hydrogen halide formed concomitantly. The reaction can be carried out in one step, or in two successive operations, whereby a mono(polyfluoroacyl)hydrazine is formed first, then reacted with an additional quantity of polyfluoroalkanecarboxylic acid amide-forming derivative, which need not be the same as that used in the first step. It is thus possible to prepare in this manner 1,2-bis(polyfluoroacyl)hydrazines in which the polyfluoroacyl groups are different. It is also possible to obtain mixed products by using more than one polyfluoroalkanecarboxylic acid derivative.

Instead of using an amide-forming derivative, the polyfluoroalkanecarboxylic acid itself can be heated with hydrazine hydrate at amidation temperature, e.g., 50–200° C., preferably with continuous removal of the water formed. The resulting product may consist substantially entirely of the 1,2-bis(polyfluoroacyl)hydrazine, or it may contain variable amounts of the hydrazine salt of the polyfluoroalkanecarboxylic acid, which may be removed, for example, by washing the crude product with water.

The polyfluoroalkanemonocarboxylic acids, or amide-forming derivatives thereof, which serve as starting materials in the above-described process, can be prepared by methods described in the journal or patent literature. Specific examples of suitable acids include trifluoroacetic acid, perfluoropropanoic acid, perfluorobutanoic acid, perfluoroisobutanoic acid, perfluoropentanoic acid, perfluorohexanoic acid, perfluorooctanoic acid [either the pure straight chain acid or a commercial mixture containing about 70% of the straight chain acid, the remainder being a mixture of the isomeric acids

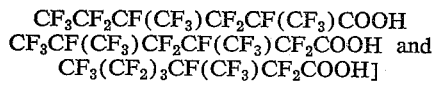

CF₃CF₂CF(CF₃)CF₂CF(CF₃)COOH
CF₃CF(CF₃)CF₂CF(CF₃)CF₂COOH and
CF₃(CF₂)₃CF(CF₃)CF₂COOH]

perfluorodecanoic acid, perfluorododecanoic acid, perfluorotetradecanoic acid, difluoroacetic acid, ω-hydroperfluoropropanoic acid, ω - hydroperfluoropentanoic acid, ω - hydroperfluoroheptanoic acid, ω - hydroperfluoroundecanoic acid, ω - hydroperfluorotridecanoic acid, ω - chloroperfluorobutanoic acid, ω - chloroperfluorooctanoic acid, α - hydro - ω - chloroperfluoropropanoic acid, and the like. The most readily available, and therefore preferred, acids for use in this process are those having from 2–14 carbon atoms.

Another method of preparing the products of this invention, which is specifically applicable to the preparation of 1,2-bis(α-hydro- or α, ω-dihydroperfluoroacyl)-hydrazines, is the acid hydrolysis, under non-oxidizing conditions, of the 1,2-dihydro-3,6-bis(polyfluoroalkyl)-s-tetrazines of the general formula

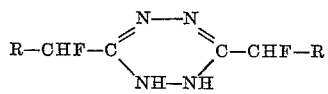

where R is fluorine or a perfluoroalkyl or ω-hydroperfluoroalkyl radical, preferably of 1–12 carbon atoms. Products of this type and their preparation are described in the article by Carboni and Lindsey already referred to and in Carboni U.S. Patent 2,817,662. The hydrolysis of the 1,2-dihydro-3,6-bis(polyfluoroalkyl)-s-tetrazine is best carried out by treatment with a strong, non-oxidizing inorganic acid such as sulfuric acid or hydrochloric acid under moderate temperature conditions, e.g., at a temperature between 20 and 100° C., for a short period which need not exceed two hours. The 1,2-bis(polyfluoroacyl)hydrazine formed during the hydrolysis can be isolated by pouring the reaction mixture into water or ice and extracting the crude solid product with an appropriate organic solvent to separate the hydrazine salt formed concomitantly. The reaction is represented by the equation

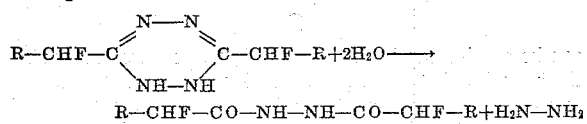

R—CHF—CO—NH—NH—CO—CHF—R+H$_2$N—NH$_2$

Suitable starting materials for use in the above-described process include the 1,2-dihydro-3,6-bis(polyfluoroalkyl)-s-tetrazines of the above formula wherein the polyfluoroalkyl substituents in the 3- and 6-positions, i.e., the R—CHF— groups, are difluoromethyl, F$_2$CH—;
1,2,2,2-tetrafluoroethyl, CF$_3$CHF—;
1-hydroperfluoropropyl, C$_2$F$_5$CHF—;
1-hydroperfluorohexyl, C$_5$F$_{11}$CHF—;
1-hydroperfluoroheptyl, C$_6$F$_{13}$CHF—;
1-hydroperfluorooctyl, C$_7$F$_{15}$CHF—;
1,3-dihydroperfluoropropyl, H(CF$_2$)$_2$CHF—;
1,7-dihydroperfluoroheptyl, H(CF$_2$)$_6$CHF—;
1,11-dihydroperfluoroundecyl, H(CF$_2$)$_{10}$CHF—;
1,13-dihydroperfluorotridecyl, H(CF$_2$)$_{12}$CHF—;
etc.

Thus, by applying the methods described above and more fully illustrated in the examples which follow, a variety of 1,2-bis(polyfluoroacyl)hydrazines can be prepared, these compounds corresponding to the formula

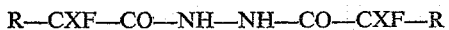

where R is fluorine, a perfluoroalkyl radical, an omega-hydroperfluoroalkyl radical, or an omega-chlorofluoroalkyl radical, and X is fluorine or hydrogen. Specific examples of these compounds include those in which the polyfluoroacyl radical, i.e., the radical R—CFX—CO—, is trifluoroacetyl,
perfluoropropanoyl,
perfluorobutanoyl,
perfluoroisobutanoyl,
perfluoropentanoyl,
perfluorohexanoyl,
perfluorooctanoyl,
perfluorodecanoyl,
perfluorododecanoyl,
perfluorotetradecanoyl,
difluoroacetyl,
ω-hydroperfluoropropanoyl,
ω-hydroperfluoropentanoyl,
ω-hydroperfluoroheptanoyl,
ω-hydroperfluoroundecanoyl,
ω-hydroperfluorotridecanoyl,
α-hydroperfluoropropanoyl,
α-hydroperfluorobutanoyl,
α-hydroperfluoroheptanoyl,
α-hydroperfluorooctanoyl,
α-hydroperfluorononanoyl,
α, ω-dihydroperfluorobutanoyl,
α, ω-dihydroperfluorooctanoyl,
α, ω-dihydroperfluorododecanoyl,
α, ω-dihydroperfluorotetradecanoyl,
ω-chloroperfluorobutanoyl,
ω-chloroperfluorooctanoyl,
α-hydro-ω-chloroperfluoropropanoyl, and the like. The most readily accessible, and therefore preferred, 1,2-bis(polyfluoroacyl)-hydrazines, are those in which the polyfluoroacyl groups have from 2–14 carbon atoms.

The following examples illustrate the invention in greater detail.

Example I 1,2 - dihydro - 3,6 - bis(1,2,2,2 - tetrafluoroethyl) - s-tetrazine (7.0 g.) was added gradually to 100 ml. of concentrated sulfuric acid with stirring. The mixture was stirred at room temperature for 45 minutes, then at 40° C. for an additional 45 minutes. The acid solution was cooled to 20° C., then slowly poured over 150 g. of crushed ice. The solid which separated was collected by filtration and washed with water. Both the solid and the filtrate were extracted with ether, leaving an ether-insoluble residue of hydrazinium sulfate. The combined ether extract was dried and evaporated to dryness, yielding 3.5 g. of crude 1,2-bis(2,3,3,3-tetrafluoropropionyl) hydrazine, CF$_3$CHFCONHNHCOCHFCF$_3$. Recrystallization from water yielded almost colorless platelets, M.P. 168–169° C. This product was identified by elemental and infrared analysis.

Analysis.—Calc'd for C$_6$H$_4$F$_8$N$_2$O$_2$: C, 25.01; H, 1.40; N, 9.73. Found: C, 25.47; H, 1.72; N, 9.53.

Example II

To a stirred solution of 38 g. (0.14 mole) of ω-hydroperfluorovaleryl chloride in benzene was gradually added 7 g. (0.14 mole) of hydrazine hydrate. External cooling was applied during this addition to dissipate the heat of the spontaneous reaction. After addition of all the hydrazine hydrate, the cooling bath was removed and the mixture was stirred for 1.5 hours, after which additional benzene was added and the mixture heated to boiling while the water formed was removed by azeotropic distillation. The reaction mixture was then filtered while hot to remove the benzene-insoluble hydrazinium salt. On cooling the filtrate, there was obtained 22 g. of colorless, glistening crystals of 1,2-bis(ω-hydroperfluorovaleryl)hydrazine, H(CF$_2$)$_4$CONHNHCO(CF$_2$)$_4$H, M.P. 131–132° C. This product was identified by its infrared spectrum and by elemental analysis of a sample from a different preparation.

Analysis.—Calc'd for C$_{10}$H$_4$F$_{16}$O$_2$N$_2$: C, 24.59; H, 0.82; F, 62.29; N, 5.73. Found: C, 24.44; H, 1.31; F, 61.20; N, 6.19.

Example III

A mixture of 49.2 g. (0.2 mole) of ω-hydroperfluorovaleric acid and 5 g. (0.1 mole) of hydrazine hydrate was refluxed in 200 ml. of benzene for 4 hours. The water formed during this period was removed by means of a water separator attached to the condenser. Most of the benzene was then removed by distillation at atmospheric pressure and the white solid that formed was separated by filtration. There was thus obtained 25.6 g. of a solid, melting at 75–102° C., which was a mixture of the 1,2-bis(ω-hydroperfluorovaleryl)hydrazine and of the hydrazine salt of ω-hydroperfluorovaleric acid. After shaking with water to extract the hydrazine salt and drying, the product was essentially pure 1,2-bis(ω-hydroperfluorovaleryl)hydrazine, M.P. 131–132° C. Its infrared spectrum was identical with that of the product of Example II. An additional 10 g. of crude acylhydrazine was isolated by further concentration of the benzene filtrate.

Example IV 1,2-bis(perfluorobutyryl)hydrazine was prepared in two steps as follows: To a solution of 0.26 mole of ethyl perfluorobutyrate in 150 ml. of ethanol was added 0.27 mole of hydrazine hydrate. The solution was refluxed gently for 4 hours, after which the ethanol was removed by distillation. The residue, a colorless syrup, crystallized on cooling and was collected by filtration, using ice water to rinse the crystals. After drying, there was obtained 53 g. of white crystals, and the filtrate yielded an additional 1.5 g. of material for a total 92% yield of mono-(perfluorobutyryl)hydrazine, C$_3$F$_7$CONHNH$_2$, M.P. 79–80° C. after recrystallization from water.

Analysis.—Calc'd for C$_4$H$_3$F$_7$N$_2$O: C, 21.06; H, 1.33; F, 58.31; N, 12.28. Found: C, 21.20; H, 1.30; F, 58.30; N, 12.10.

A solution of 15.7 g. (0.069 mole) of mono(perfluorobutyryl)hydrazine in 300 ml. of warm water was treated, while shaking vigorously, with perfluorobutyryl chloride and 10% aqueous potassium hydroxide added simultaneously in small portions, until a total of 16.0 g. (0.069 mole) of perfluorobutyryl chloride and 100 ml. of alkaline solution had been added. When the addition was complete, concentrated hydrochloric acid was added until the solution became acid to Congo red paper. The voluminous white precipitate that formed was collected by filtration and washed with 500 ml. of water. After drying, there was obtained 17.6 g. (60% yield) of 1,2-bis(perfluorobutyryl)hydrazine, $C_3F_7CONHNHCOC_3F_7$, which could be purified either by recrystallization from an ethyl acetate-petroleum ether mixture or by sublimation at 100° C. at atmospheric pressure. The purified material melted at 165–166° C.

*Analysis.*—Cal'd for $C_8H_2F_{14}N_2O_2$: C, 22.65; H, 0.47; F, 62.72; N, 6.61. Found: C, 22.50; H, 0.47; F, 63.40; N, 6.80.

*Example V*

The product of Example IV was prepared in one step as follows: To 29 g. (0.125 mole) of perfluorobutyryl chloride in 100 ml. of benzene was added gradually 6.3 g. (0.125 mole) of hydrazine hydrate, keeping the temperature at 10° C. The mixture was then refluxed for 2 hours while removing the water by means of a water separator attached to the condenser. After standing at room temperature overnight, the mixture was concentrated to a volume of about 40 ml. by evaporation under reduced pressure. There was obtained 15.6 g. of colorless crystals, M.P. 167–168° C., of 1,2-bis(perfluorobutyryl)hydrazine, $C_3F_7CONHNHCOC_3F_7$.

*Example VI*

Perfluorooctanoyl chloride (37.5 g., 0.09 mole) and hydrazine hydrate (4.5 g., 0.09 mole) were reacted in 200 ml. of benzene by the procedure of Example V. The reaction product was recrystallized from 1,2,2-trichloro-1,1,2-trifluoroethane to give 28 g. of 1,2-bis(perfluorooctanoyl)hydrazine, $C_7F_{15}CONHNHCOC_7F_{15}$, M.P. 137–139° C. The infrared spectrum confirmed the identity of the compound.

*Example VII*

ω-Hydroperfluorononanoyl chloride (72.8 g., 0.2 mole) in 250 ml. of 1,2-dimethoxyethane was treated gradually with 10.5 g. (0.2 mole) of hydrazine hydrate. The mixture was then refluxed for 1 hour and the solvent was removed by evaporation under reduced pressure. The residual semisolid was extracted with methylene chloride, leaving a residue of 96.3 g. of crude 1,2-bis(ω-hydroperfluorononanoyl)hydrazine, $$H(CF_2)_8CONHNHCO(CF_2)_8H$$

After recrystallization from a carbon tetrachloride/ether mixture, the product melted at 186–190° C. The infrared spectrum confirmed the identity of the compound.

The 1,2-bis(polyfluoroacyl)hydrazines of this invention are solids characterized by remarkable thermal stability above their melting points. Thus, for example, 1,2-bis(perfluorobutyryl)hydrazine remains completely unchanged and undecomposed after being heated at 350° C. for 5 hours in vacuum. A similar unusual resistance to heat is shown by the other 1,2-bis(polyfluoroacyl)hydrazines corresponding to the general formula shown above. This property makes them useful, as a class, as stable heat transfer media.

Another technically valuable property possessed generically by the products of this invention is their ability to combine with metal ions by coordination and thus to function as stable metal sequestering agents. This property is illustrated by the following examples.

When an ammoniacal solution of a cupric salt such as cupric chloride or cupric acetate, these solutions being deep blue in color, was treated with an excess of a 1,2-bis(polyfluoroacyl)hydrazine, e.g., 1,2-bis(perfluorobutyryl)hydrazine, dissolved in alcohol, a precipitate formed. Separation of the precipitate by filtration gave a colorless or but lightly colored ammoniacal filtrate, showing that the cupric ion had been removed from its solution.

The formation of metal coordination complexes of 1,2-bis(polyfluoroacyl)hydrazines was further shown by treating 1,2-bis(ω-hydroperfluorovaleryl)hydrazine in ethanol with an ammoniacal solution containing an excess of cupric chloride. A deep yellow color developed, then, on heating the mixture on the steam bath, a bright green precipitate separated. After 30 minutes, the mixture was cooled and the solid was collected by filtration. The infrared spectrum and chemical properties of this solid indicated that it was a coordination complex containing both the metal and the 1,2-bis(ω-hydroperfluorovaleryl)hydrazine. Similar results were obtained with 1,2-bis-(perfluorobutyryl)hydrazine.

The detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds having the formula

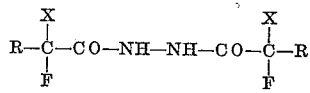

wherein R represents a member of the class consisting of fluorine, perfluoroalkyl, omega-hydroperfluoroalkyl, and omega-chloroperfluoroalkyl radicals, and X represents a member of the class consisting of fluorine and hydrogen atoms.

2. Compounds of the formula $$Z-CO-NH-NH-CO-Z$$

where Z is perfluoroalkyl.

3. Compounds of the formula $$Z-CO-NH-NH-CO-Z$$

where Z is ω-chloroperfluoroalkyl.

4. Compounds of the formula $$Z-CO-NH-NH-CO-Z$$

where Z is ω-hydroperfluoroalkyl.

5. Compounds of the formula $$Z-CO-NH-NH-CO-Z$$

where Z is α-hydroperfluoroalkyl.

6. Compounds of the formula $$Z-CO-NH-NH-CO-Z$$

where Z is α,ω-dihydroperfluoroalkyl.

7. 1,2-bis(2,3,3,3-tetrafluoropropionyl)hydrazine.
8. 1,2-bis(ω-hydroperfluorovaleryl)hydrazine.
9. 1,2-bis(perfluorobutyryl)hydrazine.
10. 1,2-bis(perfluorooctanoyl)hydrazine.
11. 1,2-bis(ω-hydroperfluorononanoyl)hydrazine.
12. Process for producing compounds of the formula

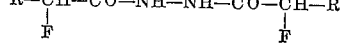

wherein R is of 1–12 carbon atoms and represents a member of the class consisting of fluorine, perfluoroalkyl and ω-hydroperfluoroalkyl which comprises effecting the acid hydrolysis, under non-oxidizing conditions, of the 1,2-dihydro-3,6-bis(polyfluoroalkyl)-s-tetrazines of the general formula

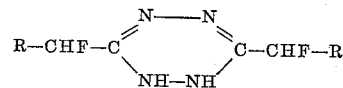

where R is defined as above, by maintaining said tetrazine in contact with an acid selected from the group consisting of hydrochloric and sulfuric acid at a temperature in the range of 20° to 100° C.

References Cited in the file of this patent

UNITED STATES PATENTS

| | | |
|---|---|---|
| 2,764,602 | Ahlbrecht | Sept. 25, 1956 |
| 2,764,603 | Ahlbrecht | Sept. 25, 1956 |
| 2,806,867 | Barnhart et al. | Sept. 17, 1957 |
| 2,824,884 | Barnhart et al. | Feb. 25, 1958 |
| 2,856,420 | Crawford | Oct. 14, 1958 |
| 2,920,086 | Barnhart et al. | Jan. 5, 1960 |

OTHER REFERENCES

Sidgwick: The Organic Chemistry of Nitrogen, Clarendon Press (Oxford), page 398 (1937).

Hackh's Chemical Dictionary, The Blakiston Company (Philadelphia), page 18 (1944).